(12) United States Patent
Hazan

(10) Patent No.: US 8,342,138 B2
(45) Date of Patent: Jan. 1, 2013

(54) DOG'S WASTE CATCHER

(75) Inventor: Moshe Hazan, Zur Hadassa (IL)

(73) Assignee: RE ' EM Hazan, Zur Hadassa (IL)

( * ) Notice: Subject to any disclaimer, the term of this patent is extended or adjusted under 35 U.S.C. 154(b) by 2 days.

(21) Appl. No.: 13/061,520

(22) PCT Filed: Sep. 1, 2009

(86) PCT No.: PCT/IL2009/000837
§ 371 (c)(1),
(2), (4) Date: Mar. 1, 2011

(87) PCT Pub. No.: WO2010/026567
PCT Pub. Date: Mar. 11, 2010

(65) Prior Publication Data
US 2011/0155078 A1 Jun. 30, 2011

Related U.S. Application Data

(60) Provisional application No. 61/093,731, filed on Sep. 3, 2008.

(51) Int. Cl.
*A01K 23/00* (2006.01)

(52) U.S. Cl. ......................................... 119/868; 119/867

(58) Field of Classification Search .................. 119/868, 119/856, 867, 869, 171, 174; 604/342, 339, 604/338, 332, 327
See application file for complete search history.

(56) References Cited

U.S. PATENT DOCUMENTS

| | | | | | |
|---|---|---|---|---|---|
| 3,656,459 | A | * | 4/1972 | Missud | 119/868 |
| 3,875,903 | A | * | 4/1975 | Sarvary | 119/868 |
| 5,386,802 | A | * | 2/1995 | Hang-Fu | 119/868 |
| 6,394,041 | B1 | * | 5/2002 | Katz | 119/868 |
| 6,494,168 | B2 | * | 12/2002 | Weng | 119/868 |
| 6,722,319 | B1 | * | 4/2004 | Chiu | 119/868 |
| 6,941,897 | B1 | * | 9/2005 | Rosales | 119/868 |
| 8,015,949 | B2 | * | 9/2011 | Dolub | 119/868 |
| 2008/0076989 | A1 | * | 3/2008 | Hete et al. | 600/323 |
| 2008/0127909 | A1 | * | 6/2008 | Albalas et al. | 119/868 |

* cited by examiner

*Primary Examiner* — T. Nguyen

(74) *Attorney, Agent, or Firm* — Vladimir Sherman; Professional Patent Solutions

(57) ABSTRACT

A simple, small, light weight and economical device for catching and holding a dog's waste before it falls on the ground. The device would be held on the dog's tail by a fastener with a simple clip mechanism. Two flexible retractable arms, in the shape of a trapezoid with no base, are attached to the fastener enabling a simple adjustable folded diaper to be caught and placed in the right position to catch and hold the dog's waste before it falls on the ground or grass. When not in use the device might be folded and become compact and easy to carry.

16 Claims, 5 Drawing Sheets

DOG'S WASTE CATCHER

FIELD of the INVENTION

This invention is in the field of disposal of animal excrement and in particular a simple device to be held on a dog's tail for catching and collecting the dog's waste.

BACKGROUND OF THE INVENTION

With the joys of having a pet, comes the responsibility of taking care of that pet and especially the need for cleaning-up after the animal has defecated, especially in public places. In urban areas and suburban neighborhoods a problem exists of animal excrement littering the streets, parks, and yards. This animal excrement, particularly from dogs, creates an unpleasant and unhealthy environment. Also, with the addition of laws requiring owners to clean up after their animals there is a need for a simple and effective device that can collect or even catch the animal excrement before it reaches the ground.

There are numerous prior art devices for the collection of excrement from an animal and especially from dogs with the goal of containing the excrement of the dog before it reaches the ground thereby making cleanup simple, easy and hygienic. Nevertheless, what is needed is a simple device which can be placed on the animal without the need to hold it or to be worn by the animal and also easily easy removable. A device that would be small, compact, light weight, easy to carry when not in use, and easy to manufacture with less costs.

SUMMARY OF THE INVENTION

It is to be understood that both the foregoing general description and the following detailed description present embodiments of the invention and are intended to provide an overview or framework for understanding the nature and character of the invention as it is claimed.

This invention reveals a simple, light-weight and economical device designed to be held on a dog's tail to catch and hold the dog's droppings before they fall on the ground or grass in a sanitary and simple method. The device is comfortable and attractive for the dog and can be placed on the dog quickly and easily.

The device would be held on the dog's tail by a fastener with the same mechanism as a simple clip for the hair that is used regularly by women. The clip is made from two portions with a coil so when pushing both handles the clip opens and when releasing the handles the coil causes the clip to close with reasonable pressure. On the inner part of both portions of the clip there would be a few small protrusions so the fastener would be held on the dog's tail with more efficiency, without falling or moving from the initial place on the tail that it has being put.

To one portion of the fastener there would be attached two flexible retractable arms that would be connected by a third arm such that together they create the shape of a trapezoid without a base. The arm that is placed opposite the missing base of the trapezoid would be connected to the fastener by a coil. The coil keeps the two arms in a folded position, closed and parallel to the fastener, but also enables opening them to be in a vertical position to the fastener or even opened in one line. When the user wants to use the device he would open the arms and would place on them a fitted diaper such that after placing the fastener on the dog's tail the diaper would be placed in position to catch the droppings.

In the open position the two arms would be in the shape of an open trapezoid without a base so both arms would be opened toward the sides. The arms would be flexible so by pushing them toward each other they would be closed a little bit becoming parallel and enabling placement of a fitted folded diaper on those arms. When releasing the arms they would return to their original position stretching the diaper in a way that the diaper would remained firmly held on those arms.

The fastener then would be placed on the dog's tail by an easy and simple act of opening the clip and placing it in the dog's tail adjusting the arms and the diaper in the correct position to collect the dog's waste before it falls on the ground or grass. After the dog is done with its excrement, then, also with an easy and simple act of opening the clip, the device would be off the dog and then by pressing the two arms the diaper is out and can be thrown straight to the garbage. The device then would be folded into a compact and easy to carry device.

The diaper might be made of a recycled material or any other disposable material, designed to fit the two arms for being placed on the arms firmly. The diaper would be folded in the way of an accordion or a concertina that would open after the dog does its excrement. The diaper or even just the back of the diaper might be colored or painted in different colors similar to the dog's color.

There might also be an additional rod that would be connected to one handle of the fastener from one side and to one of the arms from the other side such that the rod would cause an automatic opening of the arms when opening the fastener and the opposite when releasing the fastener - the arms would return to their closed position. By opening the fastener and bringing the handle closer to the arm it will push the connected arm, bringing the arms to the open position for placing the diaper on the arms and after placing the fastener on the dog's tail and releasing the fastener, the arms that automatically would be closed would be attached to the back of the dog.

The device might be sold in packages that would include at least one device and a number of disposable diapers, so the user would throw away only the diaper after being used and would use the device more than one time. Alternatively there might be a possibility that both the device and the diaper would be disposable after one use.

BRIEF DESCRIPTION OF THE DRAWINGS

The accompanying drawings are included to provide a further understanding of the invention and are incorporated into and constitute a part of this specification. The drawings illustrate various embodiments of the invention and, together with the description, serve to explain the principles and operations of the invention, by way of example only and not to limit the invention to these descriptions only.

DETAILED DESCRIPTION OF THE PREFERRED EMBODIMENTS

As will be appreciated the present invention is capable of other and different embodiments than those discussed above and described in more detail below, and its several details are capable of modifications in various aspects, all without departing from the spirit of the invention.

Accordingly, the drawings and description of the embodiments set forth below are to be regarded as illustrative in nature and not restrictive.

Figure 1:
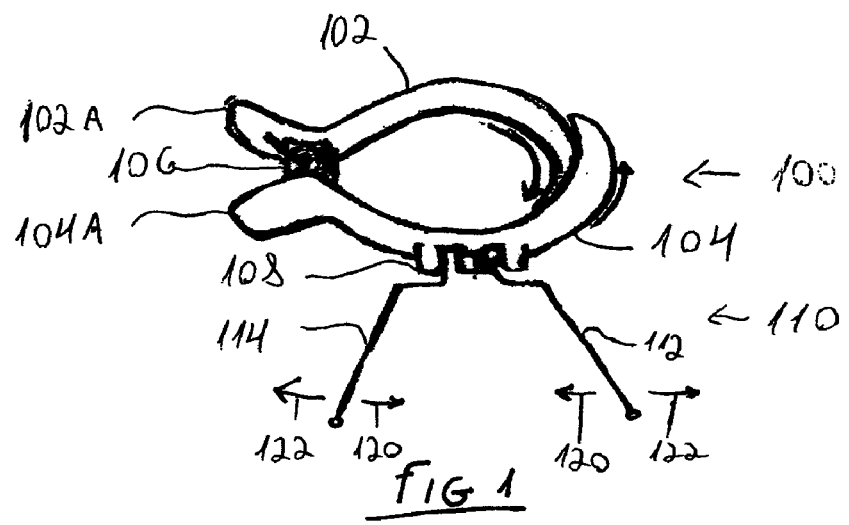
FIG. 1 is a schematic diagram of a device to be held on a dog's tail for catching and collecting the dog's waste.

FIG. 1 shows the device that is made of a fastener 100 and the two arms 110 in the trapezoid base free shape for holding a fitted disposable diaper for catching and collecting a dog's waste. The fastener 100 has the same mechanism as a simple clip that women regularly used for their hair. The fastener is made from two portions 102 and 104 with a coil 106 attaching them such that when pressing the handles 102A and 104A the fastener would be open and when releasing the handles 102A and 104A the coil 106 would cause the fastener 100 to close with reasonable pressure not to hurt and bother the dog. The fastener 100 would be made from light and simple materials, for example plastic.

The two arms 112 and 114 would be attached to one portion of the fastener 104 by connecting means 108, such as a coil, that would enable the arms to be in an open position (as seen in FIG. 1) for being used or in a closed position (see FIG. 3) when not in use.

The two arms 110 would be made from flexible material, such as light metal, so that when pushing them toward each other 120, the arms would reach up to the position of being parallel, and when released, the arms would return to their original position 122 in the shape of a trapezoid with no base. When the arms 110 are pressed and therefore close to each other, then it would be easy to place the diaper on the arms 110 and when released the arms would cause the diaper to be stretched and placed firmly on the arms 110 ready to collect and hold the dog's waste.

Figure 2:
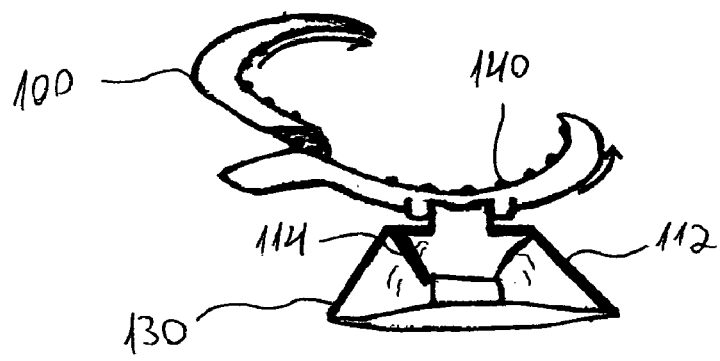
FIG. 2 is a schematic diagram a device to be held on a dog's tail for catching and collecting the dog's waste, when it is opened and ready to be placed on the dog.

FIG. 2 shows the device in its open position with the diaper 130 attached on the arms 112 and 114 and the fastener 100 opened and ready to be placed on the dog's tail.

On the inner part of the clip 100 there would be few small protrusions 140 so the fastener, when it is closed on the dog's tail, would be held efficiently, without falling or moving from the initial place on the dog's tail wherein the arms and the diaper are directed to collect the dog's waste. The diaper can be made of any disposable or recycled material.

Figure 3:
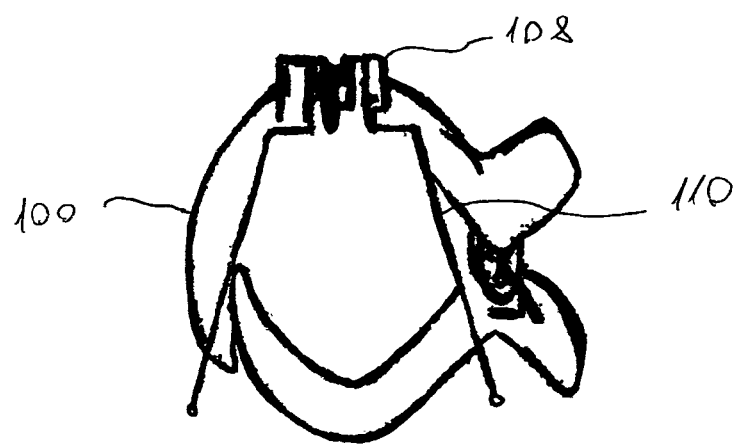
FIG. 3 is a schematic diagram of a device to be held on a dog's tail for catching and collecting the dog's waste, when it is folded.

FIG. 3 shows a device for catching and collecting a dog's waste, when it is in its closed position or when it is folded. The arms 110 would be close to the fastener 100, therefore creating a foldable compact and easy to carry device.

Figure 4:
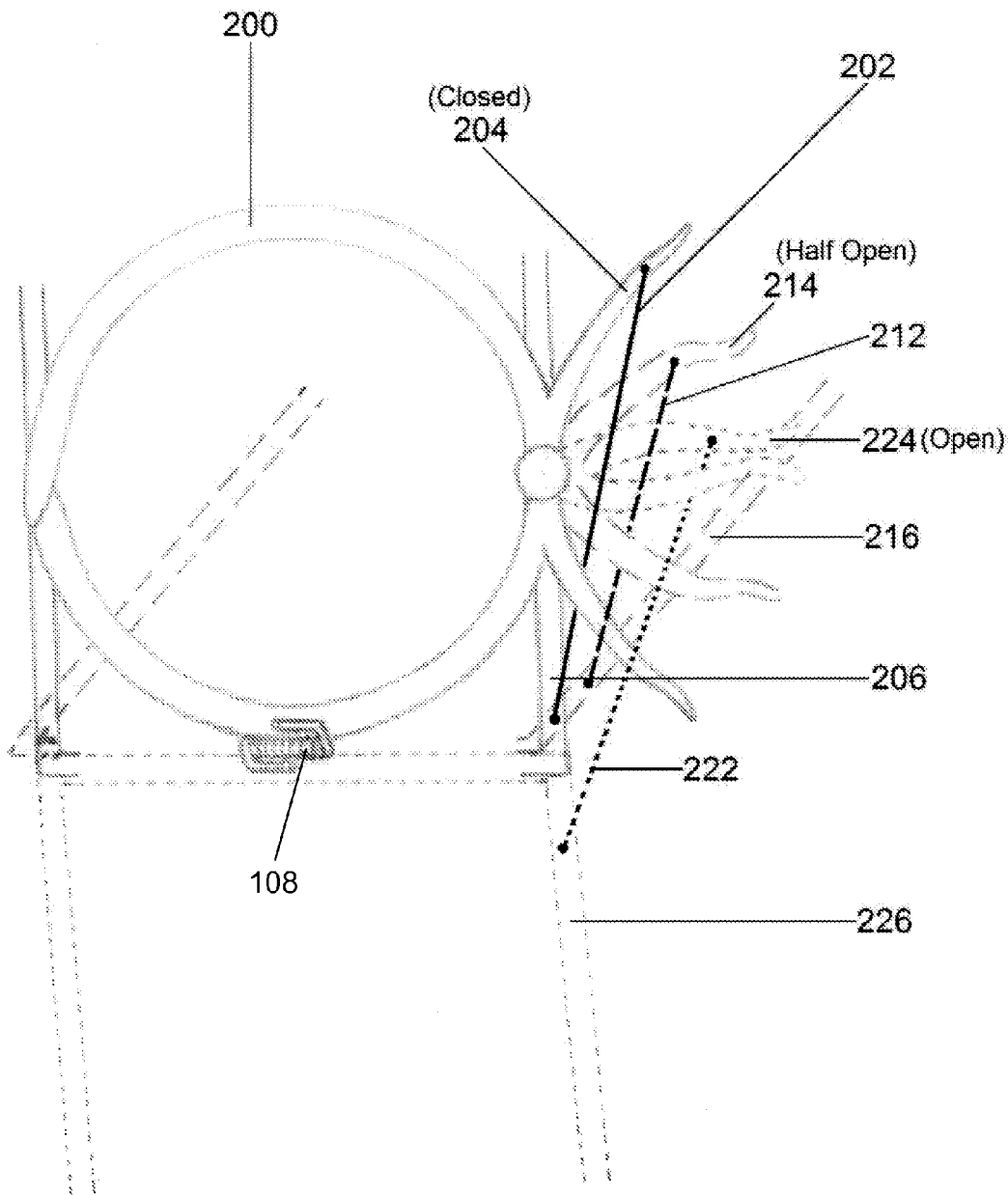
FIG. 4 is a schematic diagram of a device to be held on a dog's tail for catching and collecting the dog's waste, with the additional rod enabling an automatic opening and closing of the arms by opening and closing the fastener.

FIG. 4 shows three positions of the device with the additional rod 202 that would be connected to one handle 204 of the fastener 200 from one side and to one of the arms 206 from the other side, such that the rod 202 would cause an automatic opening of the arms when opening the fastener 200. When pressing the handles 204 the handles would first be in the position of 214 and the in full opening would be in the position of 224. When the handle would be in 214 then the rod 212 would cause to the arms to open a bit 216, and when in full opening 224 the rod 222 would cause the arms to be fully opened 226. In the open position the user would placed the diaper on the arms 226 and after placing the fastener 200 on the dog's tail and releasing the handles, the fastener 200 and the arms automatically would close and would be attached to the back of the dog.

Figure 5:
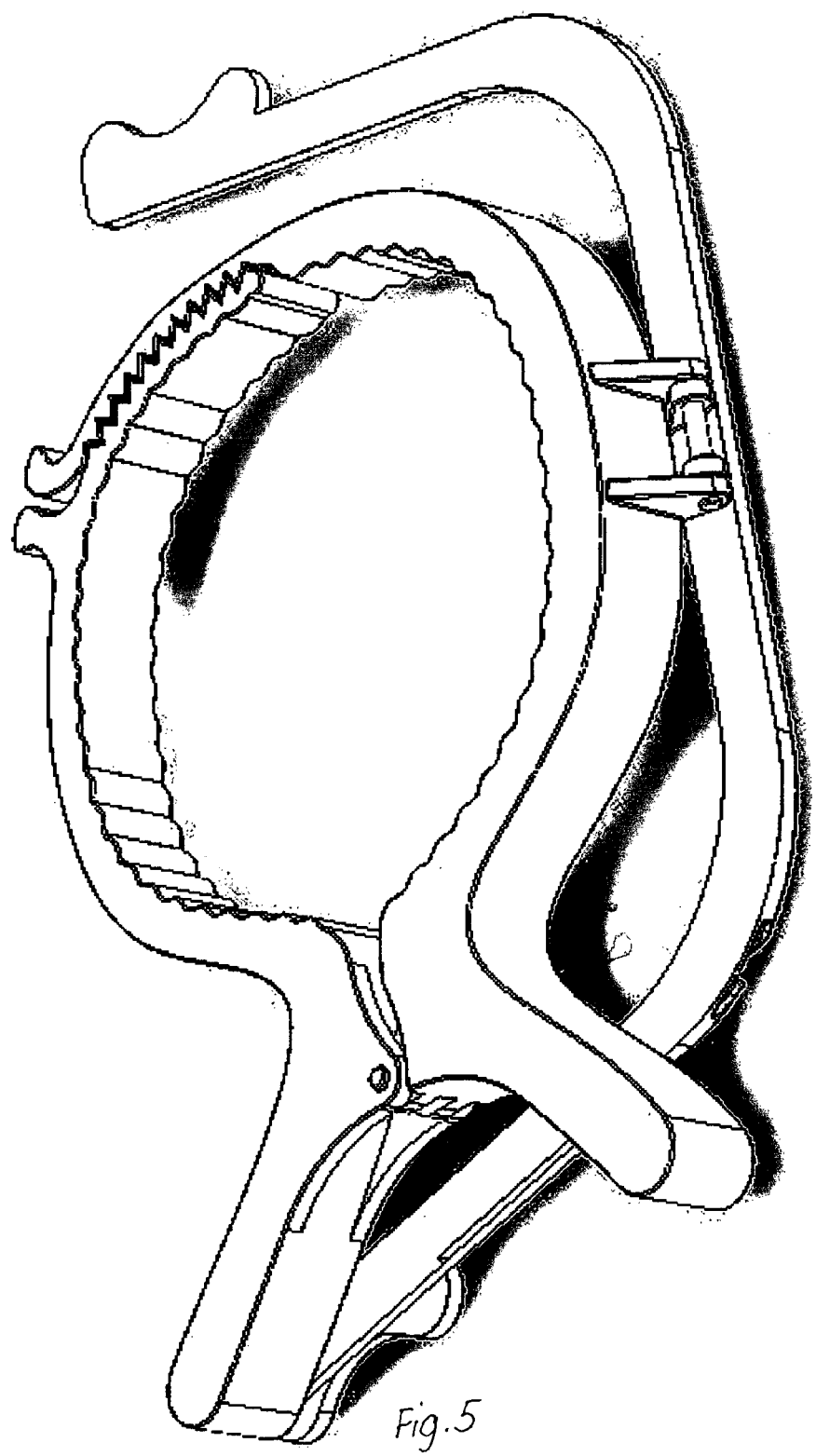
FIG. 5 shows the device in its closed position.
Figure 6:
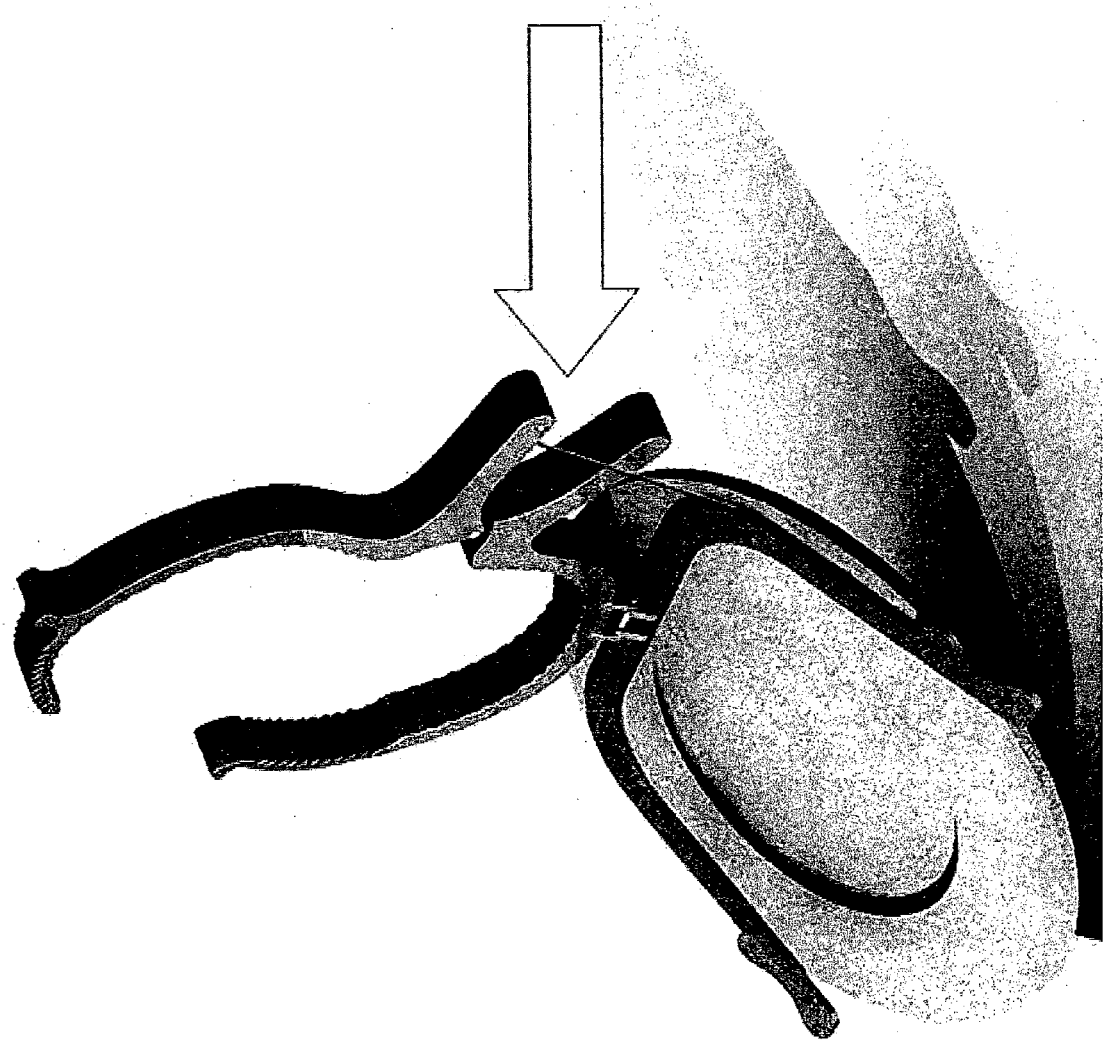
FIG. 6 presents the device in its open position.

FIG. 5 shows the device in its closed position.
FIG. 6 presents the device in its open position.

The invention claimed is:

1. An assembly for collection of canine feces, comprising:
   a fastener adapted to fasten at or near a base of a tail of a dog comprising:
      two opposing arms;
      a coil positioned to force said arms towards each other; and
      a manually actuatable disengaging element to manually force said arms away from each other;
   a feces receptacle including an open end; and
   a feces receptacle mount comprising:
      a connecting element adapted to connect said mount to said fastener;
      a support element adapted to support in an open state said feces receptacle such that said open end is oriented towards an anus of a dog to which said fastener is fastened; and
      a tension element functionally associated with said connecting element and adapted to apply tension to said support element, such that said open end is encouraged towards the anus of a dog to which said fastener is fastened.

2. The assembly according to claim 1, wherein at least one of said opposing arms of said fastener includes at least two protrusions on an inner side of said at least one of said opposing arms.

3. The assembly according to claim 1, wherein said opposing arms of said fastener are fabricated from a rigid material.

4. The assembly according to claim 3, wherein the rigid material is plastic.

5. The assembly according to claim 1, wherein said feces receptacle is colored to match a color of a dog.

6. The assembly according to claim 1, wherein said feces receptacle is adapted to enlarge from a folded state when receiving canine feces.

7. The assembly according to claim 1, wherein said tension element comprises a coil.

8. The assembly according to claim 1, wherein said support element is positioned substantially perpendicular to said fastener.

9. An assembly for collection of canine feces, comprising:
   a fastener adapted to fasten at or near a base of a tail of a dog, comprising:
      two opposing arms;
      a coil positioned to force said arms towards each other; and
      a manually actuatable disengaging element to manually force said arms away from each other;
   a feces receptacle including an open end;
   a feces receptacle mount adapted to hold the feces receptacle around said open end such that said open end is held open and further adapted to connect to said fastener, such that when said fastener is attached to a base of a tail of a given dog and said receptacle mount is connected to said fastener, said receptacle mount is positioned directly behind an anus of the given dog and forced by tension towards the anus of the given dog; and
   a tension element between said receptacle mount and said fastener creating the tension forcing said receptacle mount towards the anus of the given dog.

10. The assembly according to claim 9, wherein at least one of said opposing arms of said fastener includes at least two protrusions on an inner side of said at least one of said opposing arms.

11. The assembly according to claim 9, wherein said opposing arms of said fastener are fabricated from a rigid material.

12. The assembly according to claim 11, wherein the rigid material is plastic.

13. The assembly according to claim 9, wherein said feces receptacle is colored to match a color of a dog.

14. The assembly according to claim 9, wherein said feces receptacle is adapted to enlarge from a folded state when receiving canine feces.

15. The assembly according to claim 9, wherein the tension force applied to said receptacle mount is caused by a coil.

16. The assembly according to claim 9, wherein said receptacle mount, when connected to said fastener, is positioned substantially perpendicular to said fastener.

* * * * *